United States Patent
Lu et al.

(10) Patent No.: US 7,276,289 B2
(45) Date of Patent: Oct. 2, 2007

(54) FIRST SURFACE MIRROR WITH METAL OXIDE NUCLEATION LAYER

(75) Inventors: Yiwei Lu, Ann Arbor, MI (US); Donald V. Jacobson, Saline, MI (US); Francis Wuillaume, Plymouth, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 10/945,430

(22) Filed: Sep. 21, 2004

(65) Prior Publication Data

US 2006/0063010 A1    Mar. 23, 2006

(51) Int. Cl.
*B32B 17/06* (2006.01)
*G02B 5/08* (2006.01)

(52) U.S. Cl. ............... 428/432; 428/448; 428/697; 428/699; 428/701; 428/702; 428/912.2; 359/883; 359/884

(58) Field of Classification Search ........... 428/432, 428/448, 697, 699, 701, 702, 912.2; 359/443, 359/449, 580, 584, 585, 586, 588, 838, 883, 359/884
See application file for complete search history.

(56) References Cited

U.S. PATENT DOCUMENTS

| | | | |
|---|---|---|---|
| 4,101,707 A | 7/1978 | Henry | |
| 4,255,214 A | 3/1981 | Workens | |
| 4,309,075 A | 1/1982 | Apfel et al. | |
| 4,780,372 A | 10/1988 | Tracy et al. | |
| 5,669,681 A | 9/1997 | Ishikawa et al. | |
| 5,896,236 A | 4/1999 | Lostumo et al. | |
| 5,923,464 A | 7/1999 | Braun | |
| 5,930,046 A | 7/1999 | Solberg et al. | |
| 5,939,201 A * | 8/1999 | Boire et al. | 428/432 |
| 5,976,683 A | 11/1999 | Liehrr et al. | |
| 6,275,272 B1 | 8/2001 | Park | |
| 6,495,263 B2 | 12/2002 | Stachowiak | |
| 6,543,903 B2 * | 4/2003 | Akimoto et al. | 359/883 |
| 6,544,716 B1 | 4/2003 | Hajjar et al. | |
| 6,586,102 B1 | 7/2003 | Stachowiak | |
| 6,602,608 B2 | 8/2003 | Stachowiak | |
| 6,686,050 B2 | 2/2004 | Lingle | |
| 2002/0076564 A1 | 6/2002 | Reichert et al. | |
| 2003/0179454 A1* | 9/2003 | Thomsen et al. | 359/584 |

* cited by examiner

*Primary Examiner*—John J. Zimmerman
*Assistant Examiner*—G. Blackwell
(74) *Attorney, Agent, or Firm*—Nixon & Vanderhye P.C.

(57) ABSTRACT

A first surface mirror includes a reflective layer and one or more dielectric layers. A metal oxide (e.g., aluminum oxide) nucleation layer(s) is provided above and/or below the reflective layer in order to improve durability of the first surface mirror.

33 Claims, 6 Drawing Sheets

PROJECTION TELEVISION (PTV)

FIRST SURFACE MIRROR WITH METAL OXIDE NUCLEATION LAYER

This application is related to a first-surface mirror including a metal oxide (e.g., aluminum oxide) nucleation layer provided at least between the glass substrate and the reflective layer(s) (e.g., Al layer). In certain example embodiments, such first surface mirrors may be used in the context of a projection television (PTV) apparatus, or any other suitable application.

BACKGROUND OF THE INVENTION

Mirrors for various uses are known in the art. For example, see U.S. Pat. Nos. 5,923,464 and 4,309,075 (all hereby incorporated herein by reference). Mirrors are also known for use in projection televisions and other suitable applications. In the projection television context, see for example U.S. Pat. Nos. 6,275,272, 5,669,681 and 5,896,236 (all hereby incorporated herein by reference).

One type of mirror is a second or back surface mirror (most common), while another type of mirror is a first or front surface mirror (less common). Back surface mirrors typically include a glass substrate with a reflective coating on a back surface thereof (i.e., not on the front surface which is first hit by incoming light). Incoming light passes through the glass substrate before being reflected by the coating in a second surface mirror. Thus, reflected light passes through the glass substrate twice in back or second surface mirrors; once before being reflected and again after being reflected on its way to a viewer. In certain instances, passing through the glass substrate twice can create ambiguity in directional reflection and imperfect reflections may sometimes result. Mirrors such as bathroom mirrors, bedroom mirrors, and architectural mirrors are typically back or second surface mirrors so that the glass substrate can be used to protect the reflective coating provided on the rear surface thereof.

In applications where more accurate reflections are desired, front (or first) surface mirrors are often used. In front/first surface mirrors, a reflective coating is provided on the front surface of the glass substrate so that incoming light is reflected by the coating before it passes through the glass substrate (e.g., see FIG. 1). Since the light to be reflected does not have to pass through the glass substrate in first surface mirrors (in contrast to rear surface mirrors), first surface mirrors generally have higher reflectance than do rear surface mirrors, and no double reflected image. Example front surface mirrors (or first surface mirrors) are disclosed in U.S. Pat. Nos. 5,923,464 and 4,780,372 (both incorporated herein by reference).

Many first surface mirror reflective coatings include a dielectric layer(s) provided on the glass substrate over a reflective layer (e.g., Al or Ag). Unfortunately, when the coating becomes scratched or damaged in a front surface mirror, this affects reflectivity in an undesirable manner as light must pass through the scratched or damaged layer(s) twice before reaching the viewer (this is not the case in back/rear surface mirrors where the reflective layer is protected by the glass). Coatings typically used in this regard are not very durable, and are easily scratched or otherwise damaged leading to reflectivity problems. Thus, it can be seen that front/first surface mirrors are very sensitive to scratching. Other possible cosmetic problems associated with first surface mirrors include pinhole formations, corrosion, adhesion, and/or reflectivity level.

For example, prior art FIG. 1 of the instant application illustrates a first surface mirror including glass/Al/SiO$_2$/TiO$_2$, where the Al reflective layer is deposited directly onto the glass substrate. Such mirrors suffer from problems such as poor adhesion, pinholes, poor scratch and abrasion resistance, and other durability and cosmetic problems. These durability problems are particularly evident when float glass (soda lime silica glass) is used as the substrate.

Unfortunately, the durability of first surface mirrors as shown in FIG. 1 is problematic. First, there is poor adhesion between the metal layer (Al) and the glass substrate. Second, there is poor adhesion between the metal layer (Al) and the dielectric overcoat (SiO$_2$/TiO$_2$). Third, if a metal layer such as Cr is added below the Al between the Al and the glass substrate, corrosion of metal(s) tends to be caused by electrochemical reactions due to the flow of electrons among metals having different free energy if a multiple-layered metal (e.g., Cr/Al) is used to improve metal/glass adhesion. Thus, such first surface mirrors suffer from yield loss on mechanical durability tests due to the delamination of Al from the glass and/or silicon oxide. In the third situation, where a metal layer such as Cr is added below the Al between the Al and the glass substrate, delamination of the coating from the glass is improved but the product sometimes fails the salt fog test due to metal corrosion.

It will be apparent from the above that there exists a need in the art for a first/front surface mirror that is less susceptible to scratching, corrosion, pinhole formations, and/or the like.

BRIEF SUMMARY OF EXAMPLE EMBODIMENTS OF INVENTION

In certain embodiments of this invention, a metal oxide (e.g., aluminum oxide) inclusive nucleation layer is provided under the reflective layer (e.g., Al layer). It has surprisingly been found that providing such a nucleation layer immediately under and contacting the reflecting layer significantly improves durability of the resulting first surface mirror.

The metal oxide inclusive layer is a good nucleation layer for the reflective material such as aluminum (Al). In certain example embodiments, the metal in the metal oxide nucleation layer is the same metal as in the reflective layer (e.g., Al is in both the reflective Al layer and an aluminum oxide inclusive nucleation layer), thereby improving durability. Such a metal oxide inclusive nucleation layer is provided above and/or below the reflective layer in certain embodiments of this invention to improve adhesion above and/or below the reflective layer. It has unexpectedly been found that this significantly improves durability of the resulting first surface mirror, with respect to reducing delamination and/or corrosion.

In certain example embodiments of this invention, such first surface mirrors may be used in projection televisions, copiers, scanners, bar code readers, vehicle mirrors, overhead projectors, and/or any other suitable applications.

In certain example embodiments of this invention, there is provided a first surface mirror comprising: a substrate supporting a coating, wherein the coating includes at least a reflective layer comprising aluminum, first and second dielectric layers, and at least one layer comprising aluminum oxide; wherein the layer comprising aluminum oxide is located directly under (and/or above) and contacting the reflective layer comprising aluminum in order to improve at least durability of the first surface mirror, and wherein the reflective layer comprising aluminum reflects incoming light away from the substrate.

In other example embodiments of this invention, there is provided a first surface mirror comprising: a substrate supporting a coating, wherein the coating includes at least a reflective layer comprising a first metal, at least a first dielectric layer provided over the reflective layer, and at least one layer comprising an oxide of the first metal; wherein the layer comprising the oxide of the first metal is located directly under (and/or above) and contacting the reflective layer comprising the first metal.

In still further example embodiments of this invention, there is provided a mirror comprising: a substrate supporting a coating, wherein the coating includes at least a reflective layer and a layer comprising a metal oxide; and wherein the layer comprising the metal oxide varies in oxygen content so as to be more oxided at a location closer to the substrate than at a location further from the substrate. Stated another way, in certain example embodiments of this invention, there is provided a mirror comprising: a substrate supporting a coating, wherein the coating includes at least a reflective layer and a layer comprising a metal oxide; and wherein the layer comprising the metal oxide varies in metal content so as to have more metal at a location closer to the metal reflective layer than at a location further from the reflective layer.

BRIEF DESCRIPTION OF THE DRAWINGS

FIG. 5 is a cross sectional view of an example composition graded metal oxide nucleation layer, illustrating that the layer has less metal closer to the glass substrate than near the reflective layer.

DETAILED DESCRIPTION OF EXAMPLE EMBODIMENTS OF THE INVENTION

The instant invention relates to a mirror that may be used in the context of projection televisions (PTVs), copiers, scanners, bar code readers, overhead projectors, and/or any other suitable applications. In certain embodiments, the mirror is a first surface mirror that includes a metal oxide inclusive nucleation layer (e.g., aluminum oxide) provided above and/or below a reflective layer. The reflective layer 7 (e.g., Al, Ag, Cr, Au and/or the like) may be covered by at least one dielectric layer(s) such as $SiO_2$ and/or $TiO_2$.

Figure 2:
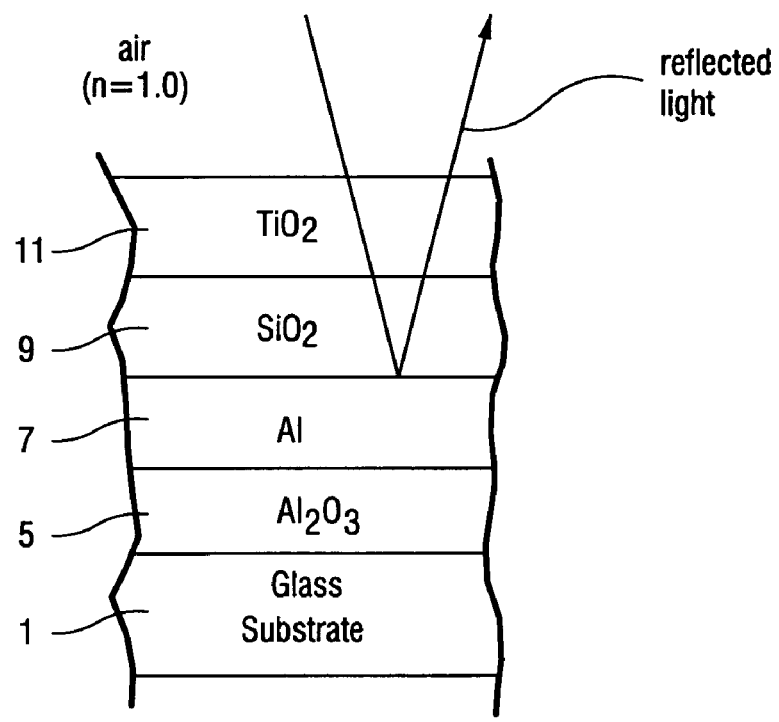
FIG. 2 is a cross sectional view of a first surface mirror according to an example embodiment of this invention.

FIG. 2 is a cross sectional view of a first surface mirror according to an example embodiment of this invention. The first surface mirror of FIG. 2 includes glass substrate 1, metal oxide nucleation layer 5, reflective layer 7, dielectric layer 9 and dielectric overcoat layer 11. Glass substrate 1 may be from about 1-10 mm thick in different embodiments of this invention, and may be any suitable color (e.g., grey, clear, green, blue, etc.). In certain example-instances, glass (e.g., soda lime silica type glass) substrate 1 is from about 1-5 mm thick, most preferably about 3 mm thick. When substrate 1 is glass, it may have an index of refraction value "n" of from about 1.48 to 1.53 (most preferably about 1.51 to 1.52).

Reflective layer 7 may be of or include Al or any other suitable reflective material in certain embodiments of this invention. Reflective layer 7 reflects the majority of incoming light before it reaches glass substrate 1 and directs it toward a viewer away from the glass substrate, so that the mirror is referred to as a first surface mirror. In certain embodiments, reflective layer 7 has an index of refraction value "n" (at 550 nm) of from about 0.05 to 1.5, more preferably from about 0.05 to 1.0. When layer 7 is of Al, the index of refraction "n" of the layer 7 may be about 0.8 to 0.9, but it also may be as low as about 0.1 when the layer 7 is of Ag. In certain example embodiments of this invention, the metallic layer 7 of Al may be sputtered onto the substrate 1 using a C-MAG rotatable cathode Al inclusive target (may or may not be doped) and/or a substantially pure Al target (>=99.5% Al) (e.g., using 2 C-MAG targets, Ar gas flow, 6 kW per C-MAG power, and pressure of 3 mTorr), although other methods of deposition for layer 7 may be used in different instances. For example, planar target(s) may also be used. In sputtering embodiments, the target(s) used for sputtering Al layer 7 may include other materials in certain instances (e.g., from 0-5% Si ). Reflective layer 7 in certain embodiments of this invention has an averaged (p- and/or s-polarization in certain instances) reflectance of at least 75% in the 550 nm region as measured on a Perkin Elmer Lambda 900 or equivalent spectrophotometer, more preferably at least 80% at any incident angle. Moreover, in certain embodiments of this invention, reflective layer 7 is not completely opaque, as it may have a small transmission in the aforesaid wavelength region of from 0.1 to 10%, more preferably from about 0.5 to 1.5%. Reflective layer 7 may be from about 10-150 nm thick in certain embodiments of this invention, more preferably from about 20-90 nm thick, even more preferably from about 25-60 nm thick, with an example thickness being about 45 nm when Al is used for layer 7. Example materials for reflective layer 7 include metallic Al; Al—Cr alloy; and/or Al 6000 Series alloy (includes mostly Al, and also some Cr, Cu, and possibly small amounts of Fe, Mg, Mn, Si, Ti and/or Zn).

Dielectric layers 9 and 11 may be made of any suitable material, although in certain example embodiments of this invention dielectric layer 9 is of or includes silicon oxide (e.g., SiO$_2$, or other suitable stoichiometry) and layer 11 is of or includes titanium oxide (e.g., TiO$_2$, or other suitable stoichiometry).

In certain example embodiments of this invention, dielectric layer 11 has a higher index of refraction "n" than does dielectric layer 9; and layer 9 has a higher index of refraction "n" than does reflective layer 7. In certain example embodiments, layer 11 has an index of refraction "n" of from about 2.2 to 2.6, more preferably from about 2.3 to 2.5; dielectric layer 9 has an index "n" of from about 1.4 to 1.8, more preferably from about 1.4 to 1.6; and layer 7 has an index "n" of from about 0.1 to 1.2, more preferably from about 0.7 to 1.0.

Figure 1:
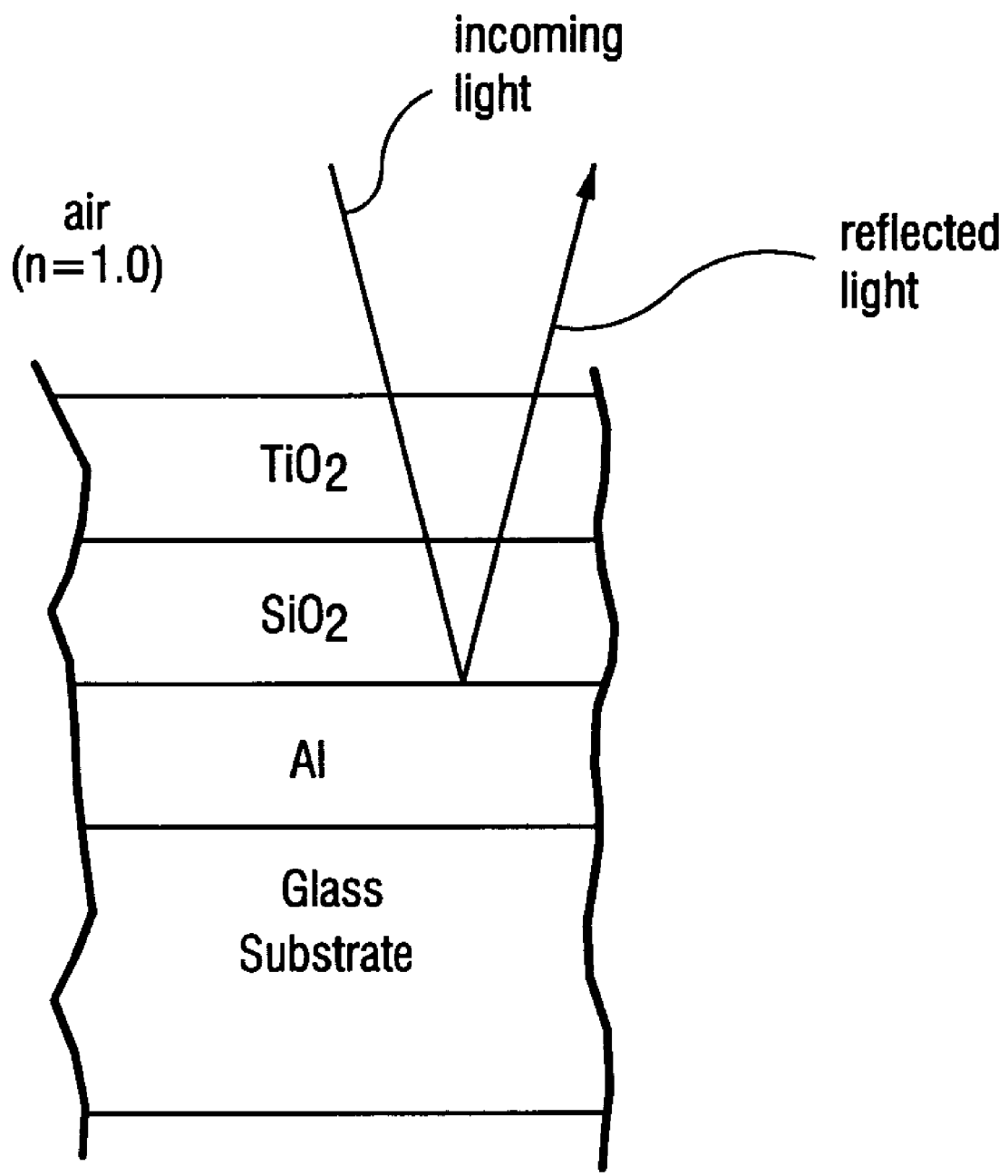
FIG. 1 is a cross sectional view of a conventional first surface mirror.

Surprisingly, it has been found that providing aluminum oxide inclusive nucleation layer 5 immediately under and contacting the Al reflective layer 7 allows for the durability of the resulting mirror to be significantly improved. In particular, the aforesaid durability problems of the FIG. 1 prior art can be greatly reduced by providing such a layer 5 under the reflective layer 7. The aluminum oxide nucleation layer 5 is a good nucleation layer for the reflective material such as aluminum (Al) of layer 7, and also adheres well to glass and can tolerate imperfect cleanliness on the glass surface. The introduction of the aluminum oxide nucleation layer 5 between the reflective metal 7 and the glass substrate 1 promotes better adhesion without the trade-off of significant corrosion problems in certain example embodiments of this invention.

Since the metal oxide nucleation layer (e.g., aluminum oxide of any suitable stoichiometry such as Al$_2$O$_3$) 5 contains a primary metal (e.g., Al) which is the same as the primary metal of the reflective layer 7, no new material needs to be introduced into the fabrication. Moreover, potential corrosion caused by free energy difference between different metals is reduced and/or eliminated, so that adhesion can be improved. In particular, adhesion is improved as both the bonding between layer 5 and glass 1, and layer 5 and layer 7, is strong due to similarities of compositional elements. Thus, improved durability results.

In certain example embodiments of this invention, at least a portion of the metal oxide nucleation layer 5 has in index of refraction (n) of from about 0.5 to 2, more preferably from 0.8 to 1.7, even more preferably from about 1.2 to 1.6.

Figure 5:
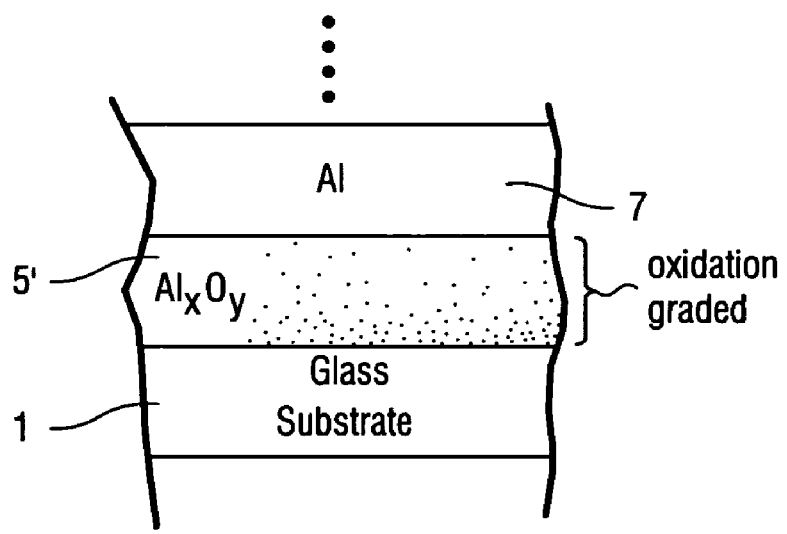
FIG. 5 is a cross sectional view of an example oxidation graded metal oxide nucleation layer, illustrating that the layer is more oxided closer to the glass substrate than near the reflective layer. Thus.
Figure 6:
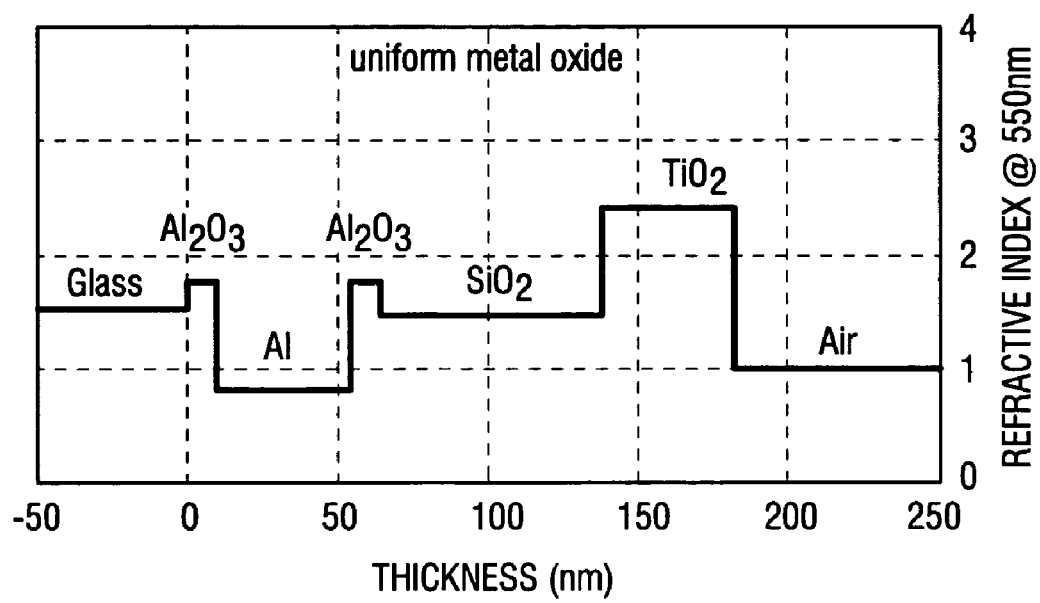
FIG. 6 is a graph plotting refractive indices (n) of a first surface mirror according to the FIG. 4 embodiment where the metal oxide nucleation layers are not oxidation (and/or composition) graded (i.e., the nucleation layers are uniformly oxided).

In certain example embodiments of this invention, the nucleation layer 5 of or including aluminum oxide may be uniformly oxided and/or in composition substantially throughout its entire thickness (e.g., see FIGS. 2 and 6). However, in other example embodiments of this invention, the nucleation layer 5' of or including aluminum oxide may be oxidation and/or composition graded (e.g., see FIGS. 3, 5 and 7). Oxidation graded means that the level of oxygen changes at different points in the layer thickness, whereas composition graded means that the composition (e.g., metal content, and/or Al content) changes at different points in the layer thickness. In composition graded embodiments, the Al (or other metal M) ratio or amount should be higher at the location closer to the Al reflective layer, and lower at the location closer to the substrate and further from the reflective layer. In certain composition graded embodiments, the layer 5 may comprise a mixture of AlO$_x$ and MO$_y$, where the substrate comprises a significant amount of M (e.g., M may be Si if the substrate is a glass substrate).

Figure 3:
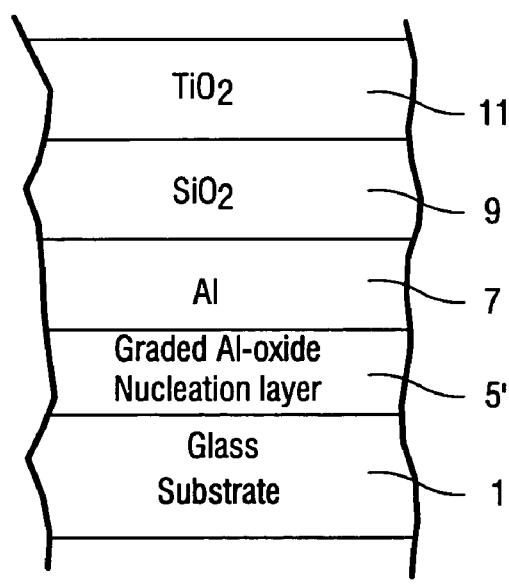
FIG. 3 is a cross sectional view of a first surface mirror according to another example embodiment of this invention, where the nucleation layer is oxidation graded so as to be more oxidized closer to the glass substrate.
Figure 7:
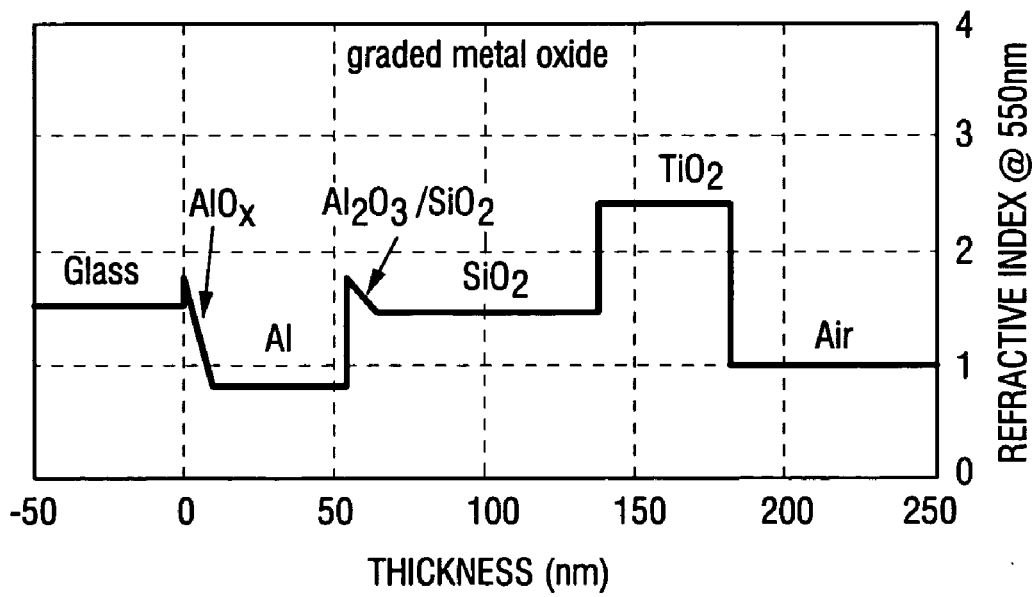
FIG. 7 is a graph plotting refractive indices (n) of a first surface mirror according to the FIG. 4 embodiment where both metal oxide nucleation layers are oxidation (and/or composition) graded.

In oxidation and/or composition graded embodiments, referring to FIGS. 3, 5 and 7 for example, the aluminum oxide nucleation layer 5' may be deposited (e.g., sputter-deposited) in a manner so as to be more oxided (and/or less Al) at a location therein closer to the glass substrate 1 than at a location further from the glass substrate and thus closer to the reflective layer 7. The oxidation/composition grading of nucleation layer 5' may be continuously progressive in a linear manner in certain example embodiments, or alternatively may be step-like in other example embodiments. In certain example embodiments, the oxidation/composition graded nucleation layer 5' may be substantially fully oxided immediately adjacent to the glass substrate 1 and substantially metallic immediately adjacent to the reflective layer 7. In an inline sputter deposition facility for example, the oxidation/composition graded nucleation layer 5' may be formed by biased reactive gas feeding, by codeposition of two adjacent sputtering targets having different compositions and/or gas flows, or by the combination of both techniques in certain example instances.

FIGS. 3 and 5 illustrate an example oxidation and composition graded embodiment where the aluminum oxide nucleation layer 5' is oxidation graded so as to be more oxided (and with less Al) closer to the glass substrate 1 and less oxided (and more Al) closer to the reflective layer 7. The dots in layer 5' in FIG. 5 represent oxygen content, and it can be seen that the oxygen content in oxidation graded layer 5' is greater at a location closes to the glass substrate 1 than at a location in the layer 5' closer to the reflective layer 7 Thus, the Al content may be less at a location closer to the glass substrate 1 than at a location in the graded layer closer to the reflective layer 7. Oxidation and/or composition graded embodiments are advantageous in that they permit improved adhesion to the substrate due to the higher oxygen (if the substrate is an oxide, e.g., glass) content proximate the substrate surface, and improved adhesion to the metal reflective layer 7 due to the higher metal content proximate the same. The existence of oxygen in the nucleation layer may help reduce potential corrosion caused by free energy difference between reflective layer 7 and substrate 1 if the substrate is a metal or metal alloy.

Figure 4:
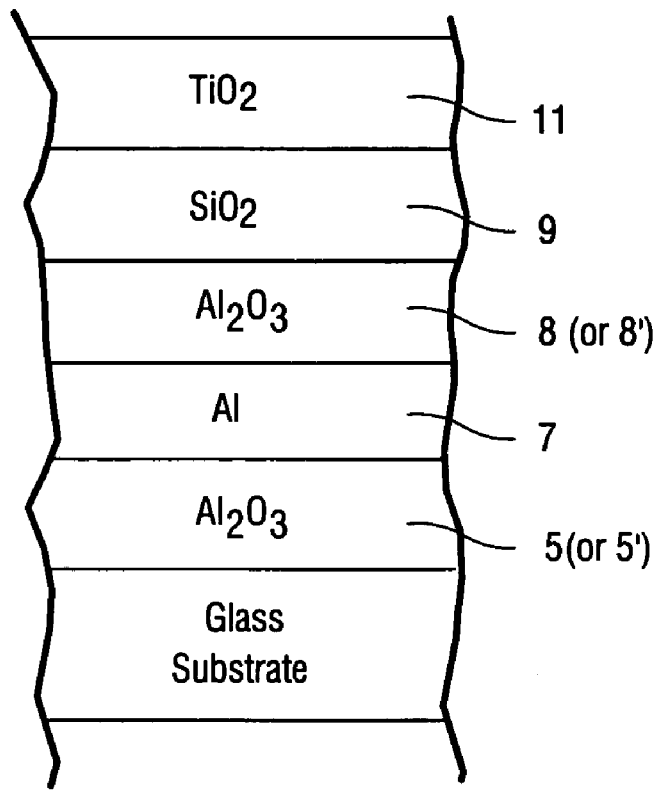
FIG. 4 is a cross sectional view of a first surface mirror according to another example embodiment of this invention where metal oxide nucleation layers are provided both immediately above and below the metallic reflective layer.

FIG. 4 illustrates another example embodiment of this invention. Given a metal oxide (e.g., aluminum oxide) without significant absorption loss in a desired spectrum range, such an upper nucleation layer 8 (uniformly oxided) and/or 8' (oxidation and/or composition graded) can be introduced above the reflective layer 7 so as to be located between the reflective layer 7 and the dielectric overcoat in order to improve adhesion therebetween. Again, since the metal oxide nucleation layer (e.g., aluminum oxide of any suitable stoichiometry such as Al$_2$O$_3$) 8 (or 8') contains a primary metal (e.g., Al) which is the same as the primary metal of the reflective layer 7, no new material needs to be introduced into the fabrication. Adhesion is improved as both the bonding between layer 8 (or 8') and layer 9, and layer 8 (or 8') and layer 7, is strong due to similarities of compositional elements given that the same primary metal is used in both the reflective layer 7 and the upper nucleation layer 8 (or 8'). Thus, improved durability results. When the upper nucleation layer is oxidation and/or composition graded, the layer 8' is more oxided at a location there closer to the overcoat dielectric than at a location therein closer to the metal reflective layer 7. This is advantageous for the reasons discussed above.

FIG. 6 illustrates example indices of refraction of the various layers according to an example of the FIG. 4 embodiment where both aluminum oxide nucleation layers 5 and 8 are uniformly oxided. FIG. 7 illustrates example indices of refraction of the various layers according to an example of the FIG. 4 embodiment where both aluminum oxide nucleation layers 5' and 8' are oxidation/composition graded. It can be seen in FIG. 7 that when the lower nucleation layer 5' is oxidation/composition graded, its index of refraction (n) becomes smaller moving through the layer from the glass 1 toward the reflective layer 7. In particular, when nucleation layer 5' is oxidation/composition graded, the index of refraction (n) thereof is higher at a location closer to the glass substrate 1 than at a location closer to the reflective layer 7. Still referring to FIG. 7, it can be seen that when the upper nucleation layer 8' is oxidation/composition graded, its index of refraction (n) becomes smaller moving through the layer from the reflective layer 7 toward the overcoat. In particular, when nucleation layer 8' is oxidation graded, the index of refraction (n) thereof is higher at a location closer to the reflective layer 7 than at a location closer to the dielectric overcoat.

In certain example embodiments of this invention, each of the nucleation layers 5 (or 5') and 8 (or 8') may be from about 5-100 nm thick, more preferably from about 5 to 50 nm thick.

In certain example embodiments of this invention, a layer of or include Cr may be located between the reflective layer 7 and the bottom nucleation layer 5 (or 5'). Moreover, while aluminum oxide is discussed herein as a material for the metal oxide inclusive nucleation layers 5, 5', 8 and 8'. Other materials may be added thereto, or other materials may instead be used. For example, in the FIG. 4 and 7 embodiments, Si may be added to the upper nucleation layer 8 (or 8'). As an example, the nucleation layer 8 (or 8') may be of or include $Si_xAl_yO_z$. In a graded example, the Si and/or O content of the layer may be graded so that the Si and/or O content is higher at the side of the layer closer to the overcoat. In other example embodiments of this invention, the nucleation layer 5 (or 5') instead of being of aluminum oxide may be of or include $TiO_x$, $Cr/TiO_x$, or $CrAlO_x$ in any of the embodiments discussed herein.

In certain example embodiments, the nucleation layer 5' may also be AxByOz; where A is the reflective layer primary material, B is the primary metal or Si under the reflective layer or in the substrate, and O represents oxygen. Not only the oxygen, but also the ratio of A/B can be graded. The A/B ratio may have a higher value at a location closer to the reflective layer, and a lower value at a location closer to the B layer. The existence of oxygen in the nucleation layer 5' helps reduce potential corrosion caused by free energy difference between layer 7 and layer B, if the layer B is a metal or metal alloy.

Figure 9:
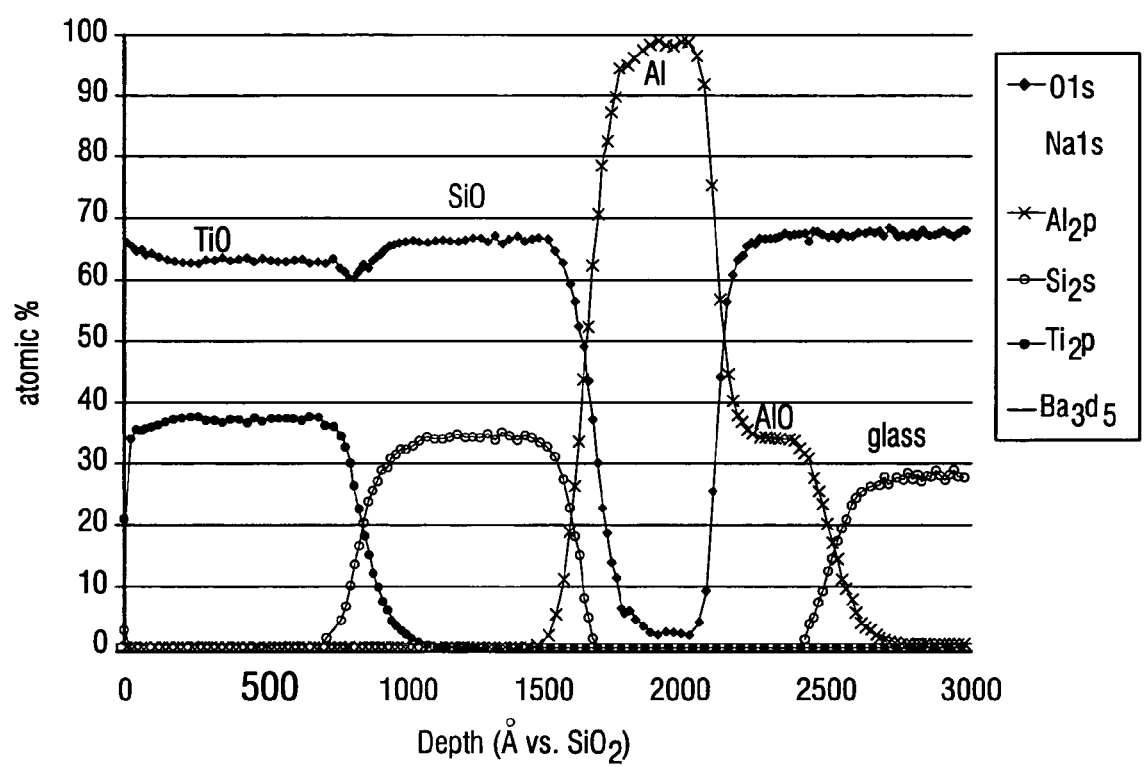
FIG. 9 is a graph plotting the atomic element content of a first surface mirror according to an example embodiment of this invention.

FIG. 9 illustrates the atomic content of a first surface mirror coating according to an example embodiment of this invention where an aluminum oxide lower nucleation layer is provided as shown in FIGS. 2-3. It can be seen in FIG. 9 that the nucleation layer is slightly graded in that its Al content changes in at least a portion of the layer. The depth in FIG. 9 is based on the sputter depth equivalent of $SiO_2$. Moreover, Sn was not monitored in the graph of FIG. 9, although it is possible that Sn for example was present at either the stack/glass interface or in the glass substrate due to the tin bath used in making the float glass substrate.

Figure 8:
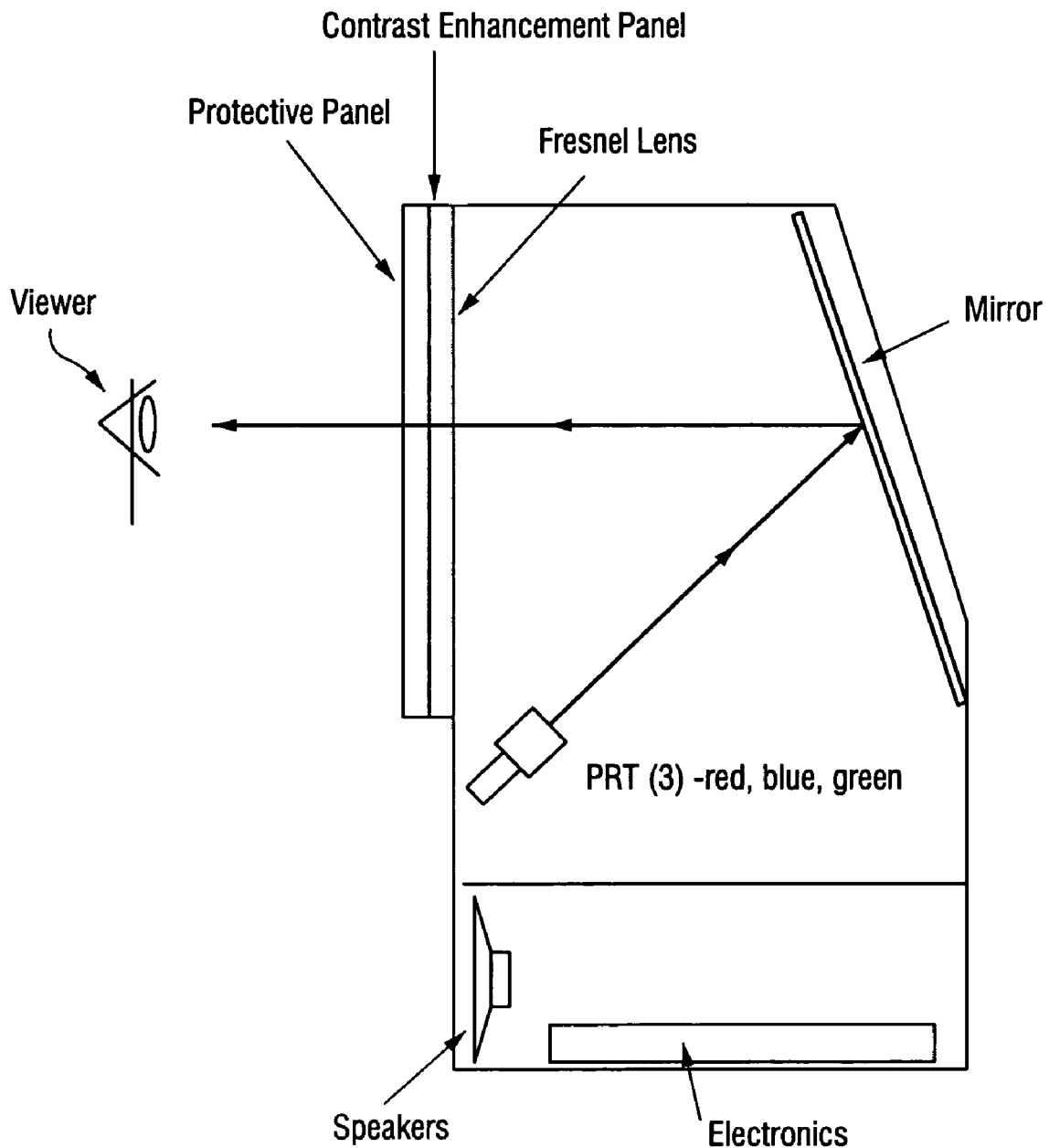
FIG. 8 is a schematic diagram illustrating a first surface mirror according to an example embodiment of this invention being used in the context of a projection television apparatus.

FIG. 8 is a schematic diagram illustrating the mirror of any of the embodiments discussed herein being used in the context of a projection television (PTV). Light is directed toward and reflected by the mirror which in turn directs the light toward a Fresnel lens, contrast enhancement panel, and/or protective panel after which it ultimately proceeds to a viewer. The improved features of the mirrors discussed herein enable an improved PTV to be provided.

Those skilled in the art will appreciate that the term "between" as used herein does not mean that a layer between two other layers has to contact the other two layers (i.e., layer A can be "between" layers B and C even if it does not contact layer(s) B and/or C, as other layer(s) can also be provided between layers B and C).

By arranging the respective materials and indices of refraction "n" of the example layers discussed above, it is possible to achieve a scratch and/or corrosion resistant, and thus durable, first surface mirror. Moreover, the first surface mirror may have a visible reflection of at least about 80%, more preferably of at least about 85%, still more preferably of at least 90%, and even at least about 95% in certain embodiments of this invention.

EXAMPLES

The following examples were made and tested, but are not intended to be limiting. The Examples had the following layers stacks, where the bottom $Al_2O_3$ inclusive nucleation layers were about 10 nm thick, the Al layers were about 45 nm thick, the $Si_xAl_yO_z$ upper nucleation layers were about 10 nm thick, the $SiO_2$ layers were about 70-76 nm thick, and the $TiO_2$ layers were about 42-48 nm thick. In Example 1, the nucleation layers were uniformly oxided, and in Example 2 they were graded:

Ex. 1 (uniform): glass/10 nm $Al_2O_3$/45 nm Al/10 nm $Al_2O_3$/76 nm $SiO_2$/42 nm $TiO_2$ Ex. 2 (graded): glass/10 nm $Si_xAl_yO_z$/Al/10 nm $Si_xAl_yO_z$/70 nm $SiO_2$/42 nm $TiO_2$ The thicknesses of silicon dioxide and titanium dioxide in Examples 1-2 were modified to minimize the optical performance difference from the conventional structure (glass/45 nm Al/90 nm $SiO_2$/40 nm $TiO_2$). It was found that the first surface mirrors of Examples 1 and 2 were much more durable than the conventional structure shown in FIG. 1, and had the following optical characteristics set forth below:

|  | Conventional | | Sample 1 | | Sample 2 | |
| --- | --- | --- | --- | --- | --- | --- |
| Incident Angle (°) | 0 | 45 | 0 | 45 | 0 | 45 |
| a* | −0.94 | −0.93 | −0.92 | −0.93 | −0.91 | −1.00 |
| b* | 0.43 | −0.50 | 0.36 | −0.51 | 0.52 | −0.49 |
| L* | 98.07 | 97.72 | 98.07 | 97.72 | 98.19 | 97.71 |
| Reflectance (%) | 95.09 | 94.22 | 95.10 | 94.21 | 95.40 | 94.20 |
| Transmittance (%) | 0.17 | 0.20 | 0.17 | 0.20 | 0.16 | 0.18 |

The color, reflectance, and transmittance shown in the table are using the CIE-C illuminant and a 2° observer. It can be seen that neutral color is provided, having a* and b* as close to zero as possible, at the desired incident angle. In the table, 45 means 45 degrees incident angle.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, the coatings discussed herein may in some instances be used in back surface mirror applications, different materials may be used, additional or fewer layers may be provided, and/or the like.

The invention claimed is:

1. A first surface mirror comprising:
   a glass substrate supporting a coating, wherein the coating includes at least a reflective layer comprising aluminum, first and second dielectric layers, and at least one layer comprising aluminum oxide, wherein the layer comprising aluminum oxide is located closer to the glass substrate than are any of the reflective layer and the dielectric layers, and wherein the reflective layer comprising aluminum is located between (a) the glass substrate, and (b) the first and second dielectric layers;

wherein the layer comprising aluminum oxide is located directly under and contacting the reflective layer comprising aluminum in order to improve at least durability of the first surface mirror, and wherein the reflective layer comprising aluminum reflects incoming light away from the glass substrate; and wherein the layer comprising aluminum oxide is more oxided at a location closer to the glass substrate than at a location further from the glass substrate.

2. The first surface mirror of claim 1, wherein the first surface mirror is located in a projection television apparatus.

3. The first surface mirror of claim 1, wherein the layer comprising aluminum oxide is continuously oxidation graded so as to be more oxided at a location closer to the substrate than at a location further from the substrate.

4. The first surface mirror of claim 1, wherein the layer comprising aluminum oxide is in direct contact with both the substrate and the reflective layer comprising aluminum.

5. The first surface mirror of claim 1, wherein the first surface mirror reflects at least about 80% of incoming visible light at about 550 nm.

6. The first surface mirror of claim 1, wherein the first dielectric layer comprises silicon oxide and the second dielectric layer comprises titanium oxide.

7. The first surface mirror of claim 1, wherein the layer comprising aluminum oxide is from about 5 to 50 nm thick.

8. The first surface mirror of claim 1, wherein the reflective layer reflects incoming light back toward a viewer before the incoming light reaches the substrate.

9. The first surface mirror of claim 1, wherein the substrate comprises soda lime silica based glass.

10. The first surface mirror of claim 1, further comprising another layer comprising aluminum oxide located above and directly contacting the reflective layer.

11. The first surface mirror of claim 1, wherein the layer comprising aluminum oxide has an index of refraction (n) which is higher at a location therein closer to the substrate than at a location therein further from the substrate.

12. The first surface mirror of claim 1, wherein the layer comprising aluminum oxide further comprises silicon.

13. The first surface mirror of claim 1, wherein the second dielectric layer is an outermost layer of the first surface mirror, and wherein the second dielectric layer has an index of refraction value "n" greater than an index of refraction value "n" of the first dielectric layer.

14. The first surface mirror of claim 13, wherein the second dielectric layer has an index of refraction value "n" of from about 2.2 to 2.6, and the first dielectric layer has an index of refraction value "n" of from about 1.4 to 1.6.

15. A first surface mirror comprising:

a glass substrate supporting a coating, wherein the coating includes at least a reflective layer comprising a first metal, at least a first dielectric layer provided over the reflective layer, and at least one layer comprising an oxide of the first metal;

wherein the layer comprising the oxide of the first metal is located directly under and contacting the reflective layer comprising the first metal; and wherein the layer comprising the oxide of the first metal varies in oxygen content so as to be more oxided at a location closer to the glass substrate than at a location further from the substrate.

16. The first surface mirror of claim 15, wherein the first metal is aluminum.

17. The first surface mirror of claim 15, wherein the first surface mirror is located in a projection television apparatus.

18. The first surface mirror of claim 15, wherein the substrate comprises soda lime silica based glass.

19. The first surface mirror of claim 15, further comprising another layer comprising an oxide of the first metal located above and directly contacting the reflective layer.

20. The first surface mirror of claim 15, wherein the layer comprising the oxide of the first metal further comprises silicon.

21. The first surface mirror of claim 20, wherein the first metal is aluminum.

22. A first surface mirror comprising:

a glass substrate supporting a coating, wherein the coating includes at least a reflective layer comprising a first metal, at least a first dielectric layer provided over the reflective layer, and at least one layer comprising an oxide of the first metal;

wherein the layer comprising the oxide of the first metal is located directly under or over, and contacting, the reflective layer comprising the first metal; and wherein the layer comprising the oxide of the first metal is located under the reflective layer and varies in oxygen content so as to be more oxided at a location closer to the glass substrate than at a location further from the substrate.

23. The first surface mirror of claim 22, wherein the first metal is aluminum.

24. The first surface mirror of claim 22, wherein the first surface mirror is located in a projection television apparatus.

25. The first surface mirror of claim 22, wherein the layer comprising the oxide of the first metal further comprises silicon.

26. The first surface mirror of claim 25, wherein the first metal is aluminum.

27. A mirror comprising:

a substrate supporting a coating, wherein the coating includes at least a reflective layer and a layer comprising a metal oxide, wherein the layer comprising the metal oxide is located between at least the substrate and the reflective layer; and wherein the layer comprising the metal oxide varies in oxygen content so as to be more oxided at a location closer to the substrate than at a location further from the substrate.

28. The mirror of claim 27, wherein the mirror reflects at least about 80% of incoming visible light at about 550 nm.

29. The mirror of claim 27, wherein the mirror is a first surface mirror.

30. The mirror of claim 27, wherein the reflective layer is composed of aluminum, and the metal oxide is aluminum oxide.

31. The mirror of claim 27, wherein the layer comprising the metal oxide comprises silicon aluminum oxide.

32. The mirror of claim 31, wherein the reflective layer comprises aluminum.

33. The mirror of claim 32, wherein the layer comprising the metal oxide comprises less than 5% Si.

* * * * *